United States Patent [19]

Suyama et al.

[11] Patent Number: 5,575,497

[45] Date of Patent: Nov. 19, 1996

[54] METHOD FOR DEVELOPING AIR BAG FOR VEHICLE

[75] Inventors: Kouichi Suyama; Kiyoshi Honda, both of Wako, Japan

[73] Assignee: Honda Giken Kogyo Kabushiki Kaisha, Tokyo, Japan

[21] Appl. No.: 490,038

[22] Filed: Jun. 13, 1995

[30] Foreign Application Priority Data

Jun. 14, 1994 [JP] Japan .................................. 6-131825

[51] Int. Cl.⁶ ................................................. B60R 21/16
[52] U.S. Cl. ..................................... 280/730.1; 280/730.2
[58] Field of Search ............................... 280/730.1, 730.2

[56] References Cited

FOREIGN PATENT DOCUMENTS

| 4019596 | 1/1992 | Germany | 280/730.2 |
|---|---|---|---|
| 4-110252 | 10/1992 | Japan . | |
| 5-105022 | 4/1993 | Japan . | |

Primary Examiner—Kenneth R. Rice
Attorney, Agent, or Firm—Armstrong, Westerman, Hattori, McLeland & Naughton

[57] ABSTRACT

Each of air bag devices includes an inflator mounted in a seat back, a first air bag which is connected to the inflator and developed into a space between an occupant and a side door, and a second air bag connected to the first air bag and developed into a space between the occupant and an instrument panel. When the internal pressure in the first air bag exceeds a predetermined value, the internal spaces in the first and second air bags are put into communication with each other through a pressure valve. When a vehicle collides with another vehicle or an obstacle, the first air bag is first inflated and developed by a high pressure gas generated by the inflator. When the first air bag has been developed, the pressure valve V is opened, causing the second air bag to be developed. Thus, not only upon a frontal collision and a side collision of the vehicle, but also upon an oblique collision of the vehicle, it is possible to reliably hold the occupant.

4 Claims, 6 Drawing Sheets

METHOD FOR DEVELOPING AIR BAG FOR VEHICLE

BACKGROUND OF THE INVENTION

1. Field of the Invention

The present invention relates to a method for developing an air bag for a vehicle into a vehicle compartment to hold an occupant of a vehicle, by a high pressure gas generated by an inflator, when an acceleration greater than a predetermined value is detected.

2. Description of the Prior Art

There are air bag devices for vehicles such as known from Japanese Patent Application Laid-open Nos. 105022/93 and 110252/92, which are capable of holding an occupant when the vehicle comes into any of a frontal collision and a side collision.

In the air bag device described in Japanese Patent Application Laid-open No. 105022/93, an air bag including an inflator and adapted to be operated upon the frontal collision of the vehicle is mounted in an instrument panel, and an air bag adapted to be operated upon the side collision is mounted in a side door. The side-collision air bag is connected to the inflator through a duct.

In the air bag device described in Japanese Patent Application Laid-open No. 110252/92, a single air bag is developed into a U-shaped or L-shaped (as viewed in a plane) inflated state, so that the front and side of an occupant can be held by the single air bag.

In general, the distance between the occupant and the side door is smaller than the distance between the occupant and the instrument panel and for this reason, it is necessary to develop the side-collision air bag earlier than the frontal-collision air bag, when the vehicle gets a shock from an oblique direction. In the above known air bag devices, however, the timings for developing the side-collision air bag and the frontal-collision air bag are not taken into consideration and for this reason, there is a possibility that the occupant cannot be reliably held upon the side collision or oblique collision of the vehicle.

SUMMARY OF THE INVENTION

Accordingly, it is an object of the present invention to provide a method for developing an air bag for a vehicle, which is capable of reliably holding an occupant not only upon the frontal collision and side collision of the vehicle, but also upon the oblique collision of the vehicle.

To achieve the above object, according to a first aspect and feature of the present invention, there is provided a method for developing an air bag for a vehicle into a vehicle compartment to hold an occupant of the vehicle, by a high pressure gas generated by an inflator, when an acceleration greater than a predetermined value is detected, wherein the method comprises the step of developing the air bag through a space between the occupant and a side door into a space between the occupant and an instrument panel.

With the first feature of the present invention, the air bag can be placed quickly into the narrow space between the occupant and the side door to reliably hold the occupant even upon the side collision or oblique collision of the vehicle. In addition, the front and side of the occupant can be held by the single air back and therefore, it is possible to provide reductions in number of parts, in size of the air bag device and in manufacturing cost.

According to a second aspect and feature of the present invention, there is provided a method for developing an air bag means for a vehicle into a vehicle compartment to hold an occupant of the vehicle, by a high pressure gas generated by an inflator means, when an acceleration greater than a predetermined value is detected, wherein the air bag means comprises a first air bag which is developed into a space between the occupant and a side door, and a second air bag which is developed into a space between the occupant and an instrument panel, the first and second air bags being integrally coupled to each other, the method comprising the step of developing the second air bag with a predetermined time lag after development of the first air bag.

With the second feature of the present invention, it is possible to place the air bag quickly into the narrow space between the occupant and the side door to reliably hold the occupant even upon side collision or oblique collision of the vehicle.

According to a third aspect and feature of the present invention, in addition to the second feature, the first and second air bags have internal spaces independent from each other and include a first inflator and a Second inflator, respectively, the second inflator being operated with the predetermined time lag after operation of the first inflator.

With the third feature of the present invention, it is possible to quickly develop the first air bag prior to the second air bag.

According to a fourth aspect and feature of the present invention, in addition to the second feature, internal spaces in the first and second air bags are in communication with each other through a gas flow limiting means, the high pressure gas generated by the inflator means being supplied from the internal space in the first air bag through the gas flow limiting means into the internal space in the second air bag.

With the fourth feature of the present invention, it is possible to quickly develop the first air bag prior to the second air bag.

The above and other objects, features and advantages of the invention will become apparent from preferred embodiments taken in conjunction with the accompanying drawings.

DESCRIPTION OF THE PREFERRED EMBODIMENTS

The present invention will now be described by way of preferred embodiments with reference to the accompanying drawings.

Referring to FIGS. 1 to 3E, an air bag device $A_D$ for a driver's seat $S_D$ and an air bag device $A_N$ for a passenger seat $S_N$ are disposed in a vehicle laterally symmetrically with each other with respect to a center line of a vehicle body and have substantially the same structure. Each of the air bag devices $A_D$ and $A_N$ includes an inflator I mounted an outer portion of a seat back $S_1$ of each of the driver's seat $S_D$ and the passenger seat $S_N$ for injecting a high pressure gas, a first air bag $B_S$ which is inflated and developed along an inner surface of a side door D by the high pressure gas from the inflator I, and a second air bag $B_F$ which is integrally coupled to the first air bag $B_S$ and inflated and developed along a rear surface of an instrument panel P. The first and second air bags $B_S$ and $B_F$ are formed separately and united integrally by stitching, and are mounted in their compact folded states in the outer portions of the seat backs $S_S$ along with the inflators.

Figure 2:
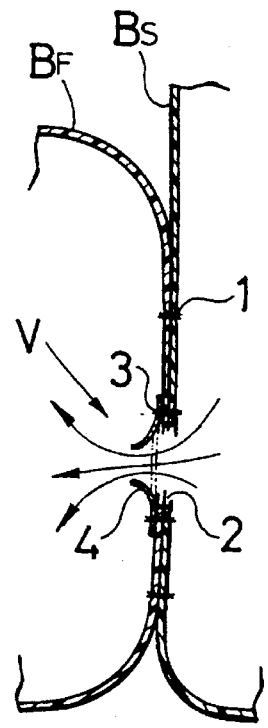
FIG. 2 is an enlarged sectional view taken along a line 2—2 in FIG. 1.

As can be seen by reference also to FIG. 2, two pressure valves V, V are mounted at a joint between the first and second air bags $B_S$ and $B_F$ united integrally by a stitching 1. Each of the pressure valves V is comprised of a circular opening 2 defined in the first and second air bags $B_S$ and $B_F$ superposed on each other, and a membrane 4 placed to cover the opening 2 and fixed by a stitching 3. When the membrane 4 is in a state shown by a dashed line in FIG. 2, it air-tightly partitions an internal space in the first air bag $B_S$ and an internal space in the second air bag $B_F$ from each other. When the internal pressure in the first air bag $B_S$ is increased to exceed a predetermined value, the membrane 4 is broken into a state shown by a solid line in FIG. 2 to put the internal space in the first air bag $B_S$ into communication with the internal space in the second air bag $B_F$.

If the vehicle comes into a frontal, side or oblique collision with another vehicle or an obstacle and as a result, an acceleration sensor (not shown) detects an acceleration larger than a predetermined value, the inflator I is operated to generate a high pressure gas by burning of a propellant. The high pressure gas flows first into the internal space in the first air bag $B_S$ to inflate and develop the first air bag $B_S$ into a space between an occupant and the side door D. The pressure valves V, V remain closed until the first air bag $B_S$ is completely developed. Therefore, the second air bag $B_S$ is retained, in its folded state, at the front end of the developed first air bag $B_S$. When the first air bag $B_S$ has been completely developed so that the internal pressure in the first air bag $B_S$ has been increased, the membranes 4 of the pressure valves V, V are broken as shown by the solid line in FIG. 2 to open the opening 2. This causes the high pressure gas in the first air bag $B_S$ to flow into the second air bag $B_F$ to inflate and develop the second air bag $B_F$ into a space between the occupant and the instrument panel P.

As described above, the first air bag $B_S$ for holding the side of the occupant is first developed and the second air bag $B_F$ for holding the front surface of the occupant is then developed. Therefore, the first air bag $B_S$ can be quickly placed into a small clearance between the occupant and the side door D, thereby reliably protecting the occupant without a delay even upon the side collision or the oblique collision of the vehicle. Moreover, since the first and second air bags $B_S$ and $B_F$ are united to each other and developed by the common inflator I, it is possible to reduce the sizes of the air bag devices $A_D$ and $A_N$ and to easily mount them in the seat back $S_1$.

FIGS. 3A to 3G illustrate other embodiments of the present invention in which air bag devices $A_D$ and $A_N$ are mounted in a seat back $S_1$.

Figure 3A:
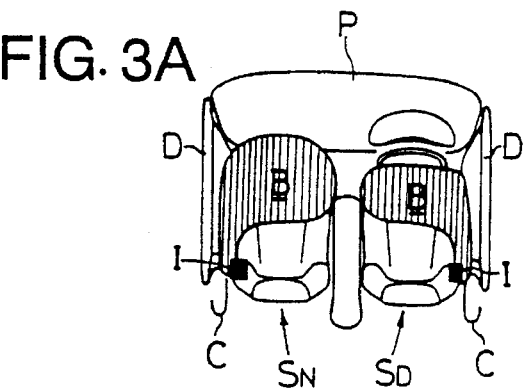
FIGS. 3A to 3G are diagrams illustrating embodiments in which air bag devices are mounted in a seat back.

In an embodiment shown in FIG. 3A, each of the air bag devices $A_D$ and $A_N$ has a single air bag B which is developed by means of an inflator I mounted in an outer portion of the seat back $S_1$. At the time of operation, the air bag B is first developed forwardly of the vehicle body along the inner surface of the side door D and then developed inwardly or laterally of the vehicle body along the rear surface of the instrument panel P. Therefore, the air bag can quickly be placed into the small clearance between the occupant and the side door D to reliably protect the occupant without a delay even upon the side collision or the oblique collision. Additionally, since the structure of the air bag B is simplified in this embodiment and hence, it is possible to reduce the manufacturing cost.

Figure 3B:
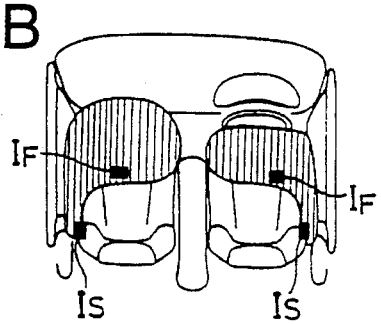

An embodiment shown in FIG. 3B includes a first inflator $I_S$ corresponding to the inflator I in the embodiment shown in FIG. 3A, and further includes a second inflator $I_F$ mounted at that portion of the air bag B which is opposed to the instrument panel P. A predetermined time lag is set for the operation of the first and second inflators $I_S$ and $I_F$, so that the second inflator $I_F$ $I_S$ operated with the time lag after the operation of the first inflator $I_S$. In the embodiment shown in FIG. 3B, the air bag B can be developed forwardly of the vehicle body along the inner surface of the side door D and then immediately developed inwardly or laterally of the vehicle body along the rear surface of the instrument panel P.

Figure 3C:
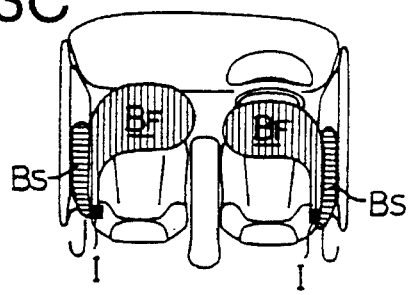

In the embodiment shown in FIG. 3C, each of air bag devices $A_D$ and $A_N$ includes a first air bag $B_S$ and a second air bag $B_F$ which are independent from each other and which are connected to a common inflator I mounted in the seat back $S_1$. The inflator I inflates and develops the first and second bags $B_S$ and $B_F$ by burning a common propellant. A diameter of a gas injection port for supplying a high pressure gas into the first air bag $B_S$ is set at a value larger than a diameter of a gas injection port for supplying the high pressure gas into the second air bag $B_F$. With this arrangement, it is possible to first develop the first air bag $B_S$ for holding the side of the occupant, and then to develop the second air bag $B_F$ for holding the front of the occupant. In the embodiment shown in FIG. 3C, a time lag as described above can be provided by a simple structure in which a difference in diameter is only provided between the gas injection ports for supplying the high pressure gas into the first and second air bags $B_S$ and $B_F$.

Figure 3D:
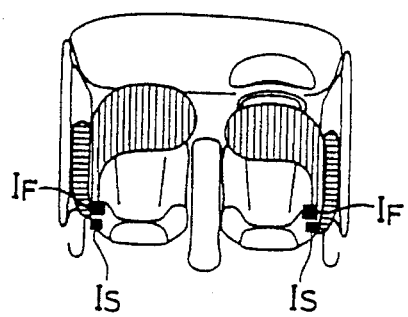

In the embodiment shown in FIG. 3D, each of air bag devices $A_D$ and $A_N$ includes a first air bag $B_S$ and a second air bag $B_F$ independent from each other. A first inflator $I_S$ connected to the first air bag $B_S$ is first operated, and a second inflator $I_F$ connected to the second air bag $B_F$ is then operated, thereby developing the first and second air bags $B_S$ and $B_F$ with a time lag therebetween. In the embodiment shown in FIG. 3D, such time lag can be set at any value by controlling the timing of operation of the first and second inflators $I_S$ and $I_F$.

Figure 1:
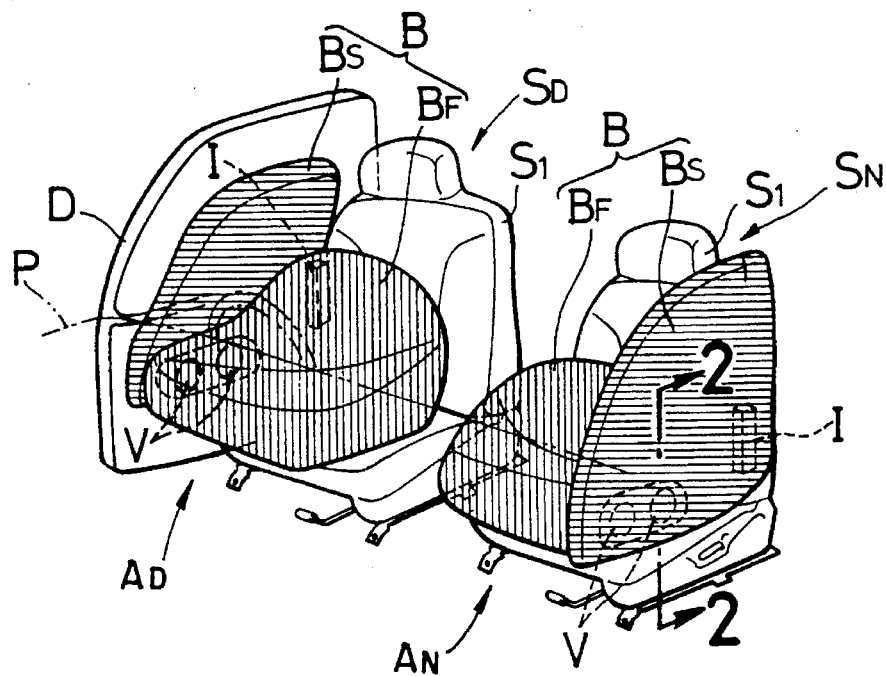
FIG. 1 is a perspective view of a primary embodiment of the present invention.

The embodiment shown in FIG. 3E has been previously described with reference to FIGS. 1 and 2.

Figure 3E:
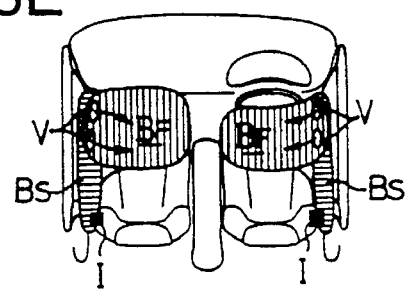
Figure 3F:
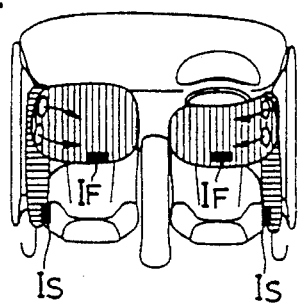

The embodiment shown in FIG. 3F includes a first inflator $I_S$ corresponding to the inflator I in the embodiment shown in FIG. 3E, and further includes a second inflator $I_F$ mounted within a first air bag $B_S$. A time lag is established between the operations of the first and second inflators $I_S$ and $I_F$, so that the second inflator $I_F$ is operated with this time lag after the operation of the first inflator $I_S$. In the embodiment shown in FIG. 3F, the second air bag $B_F$ can be developed quickly after the development of the first air bag $B_S$.

Figure 3G:
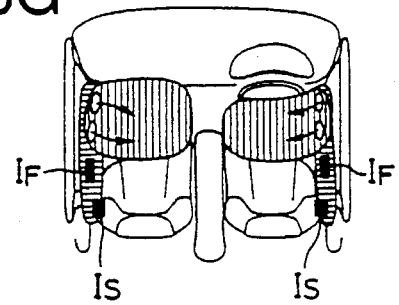
Figure 4A:
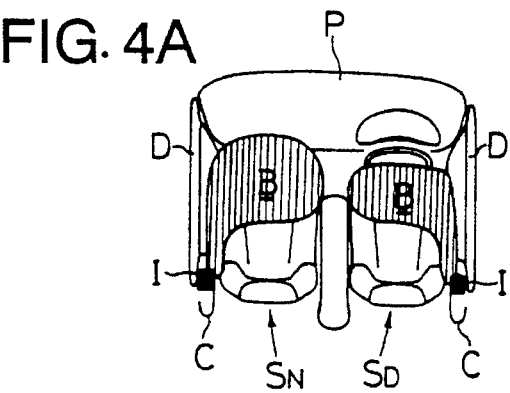
FIGS. 4A to 4G are diagrams illustrating embodiments in which air bag devices are mounted in a center pillar.
Figure 4E:
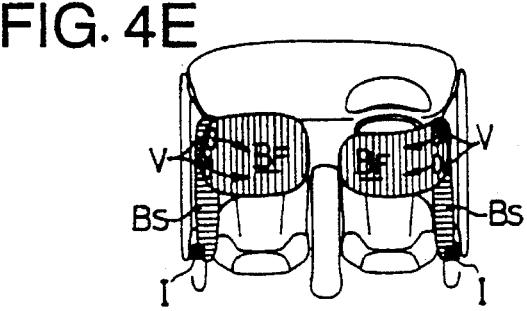
Figure 4B:
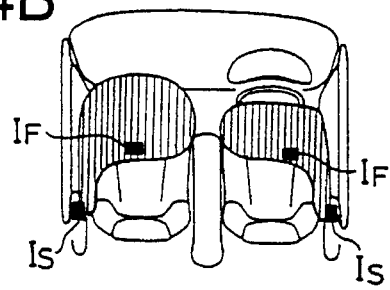
Figure 4F:
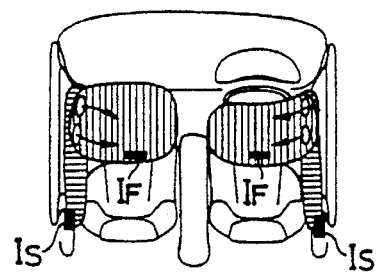
Figure 4C:
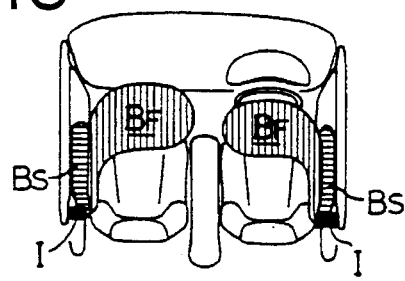
Figure 4G:
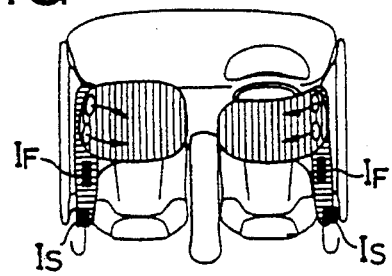
Figure 4D:
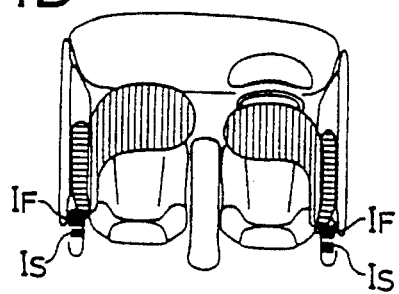
Figure 5A:
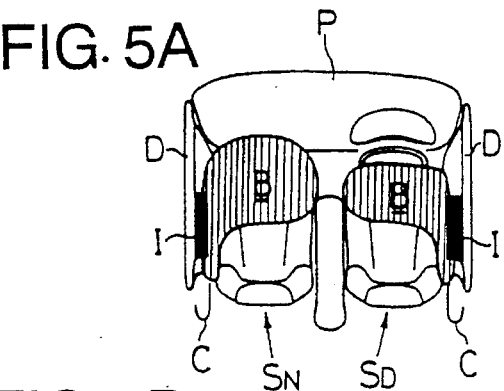
FIGS. 5A to 5G are diagrams illustrating embodiments in which air bag devices are mounted in a side door.
Figure 5E:
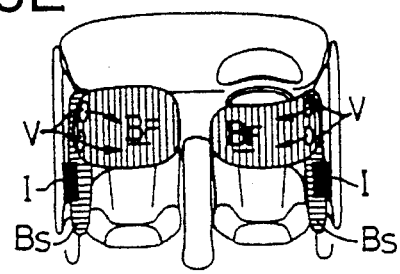
Figure 5B:
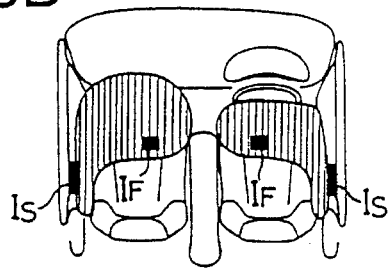
Figure 5F:
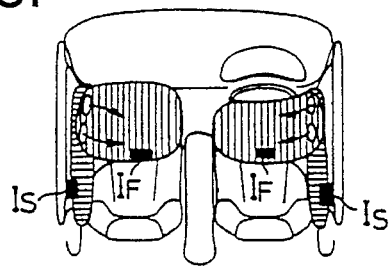
Figure 5C:
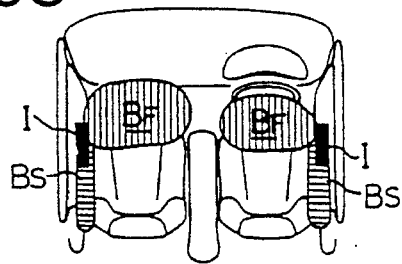
Figure 5G:
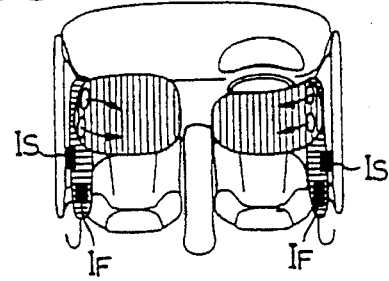
Figure 5D:
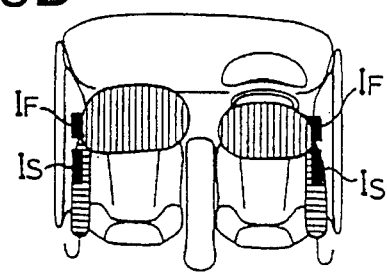
Figure 6C:
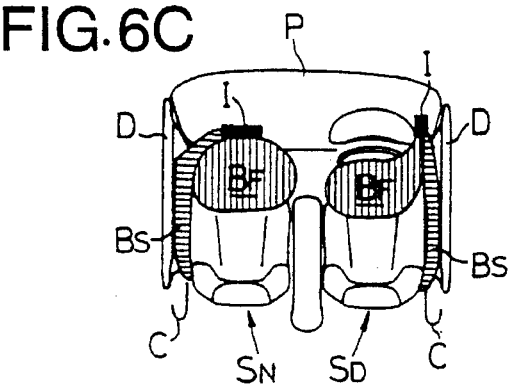
FIGS. 6C to 6G are diagrams illustrating embodiments in which air bag devices are mounted in an instrument panel.
Figure 6E:
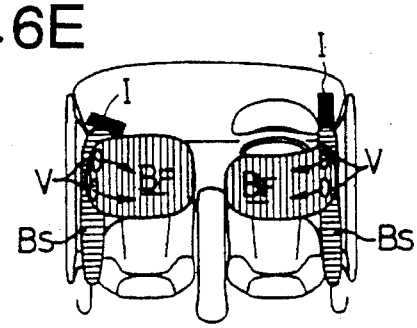
Figure 6D:
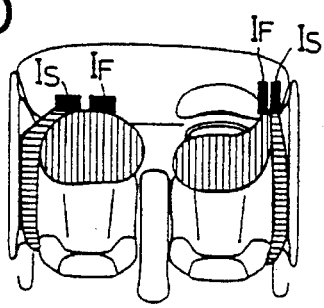
Figure 6F:
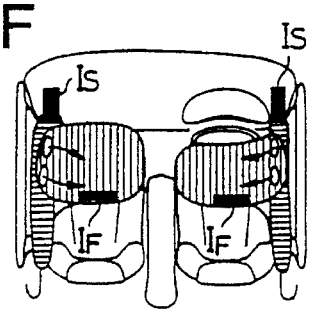
Figure 6G:
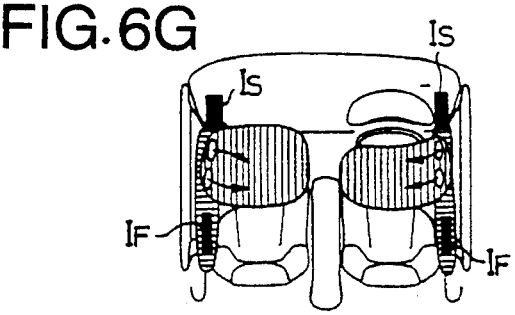
Figure 7C:
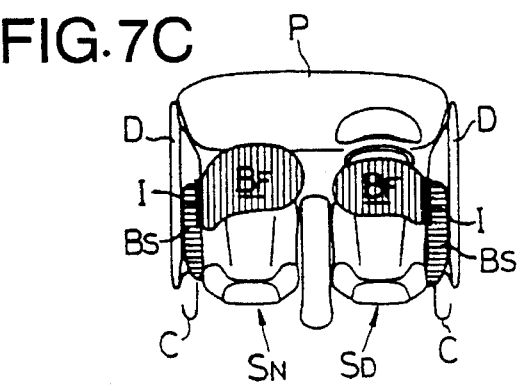
FIGS. 7C to 7G are diagrams illustrating embodiments in which air bag devices are mounted in a roof.
Figure 7E:
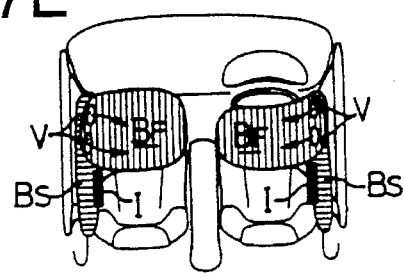
Figure 7D:
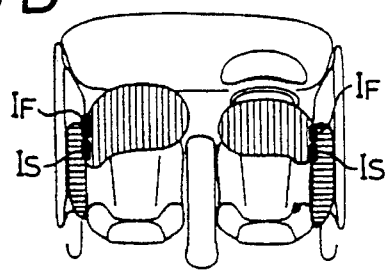
Figure 7F:
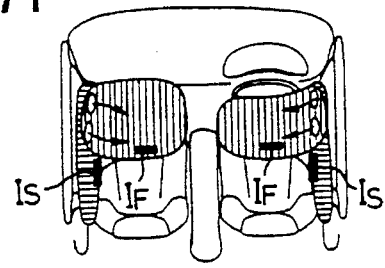
Figure 7G:
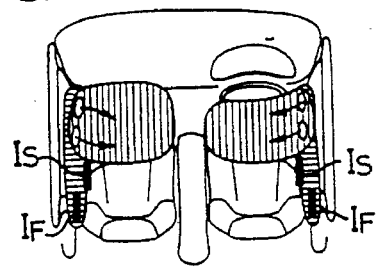

The embodiment shown in FIG. 3G includes a first inflator $I_S$ corresponding to the inflator I in the embodiment shown in FIG. 3E, and further includes a second inflator $I_F$ mounted within a first air bag $B_S$. A time lag is established between the operations of the first and second inflators $I_S$ and $I_F$, so that the second inflator $I_F$ is operated with this time lag after the operation of the first inflator $I_S$. Even in the embodiment shown in FIG. 3G, the second air bag $B_F$ can be promptly developed after the development of the first air bag $B_S$.

FIGS. 4A to 4G illustrate other embodiments in which air bag devices $A_D$ and $A_N$ are mounted in center pillars C. FIGS. 4A to 4G correspond to FIGS. 3A to 3G, respectively. However, in each of the embodiments shown in FIGS. 4A to 4G, each of the inflators I, $I_S$ and $I_F$ is mounted in the center pillar C in place of mounting in the seat back $S_1$ in each of the embodiments shown in FIGS. 3A to 3G. By each of the embodiments shown in FIGS. 4A to 4G, it is possible to provide an operational effect similar to that in each of the embodiments shown in FIGS. 3A to 3G.

FIGS. 5A to 5G illustrate further embodiments in which air bag devices $A_D$ and $A_N$ are mounted in side doors D. FIGS. 5A to 5G correspond to FIGS. 3A to 3G, respectively. However, in each of the embodiments shown in FIGS. 5A to 5G, each of the inflators I, $I_S$ and $I_F$ is mounted in the side door D, in place of mounting in the seat back $S_1$ in each of the embodiments shown in FIGS. 3A to 3G. By each of the embodiments shown in FIGS. 5A to 5G, it is possible to provide an operational effect similar to that in each of the embodiments shown in FIGS. 3A to 3G.

FIGS. 6C to 6G and 7C to 7G illustrate yet further embodiments in which air bag devices $A_D$ and $A_N$ are mounted in an instrument panel P and a roof, respectively. FIGS. 6C to 6G and 7C to 7G correspond to FIGS. 3C to 3G, respectively. However, in each of the embodiments shown in FIGS. 6C to 6G, each of the inflators I, $I_S$ and $I_F$ is mounted in the instrument panel P, in place of mounting in the seat back $S_1$ in each of the embodiments shown in FIGS. 3C to 3G. In each of the embodiments shown in FIGS. 7C to 7G, each of the inflators I, $I_S$ and $I_F$ is mounted in the roof, in place of mounting in the seat back $S_1$ in each of the embodiments shown in FIGS. 3A to 3G. By each of the embodiments shown in FIGS. 6C to 6G and 7C to 7G, it is possible to provide an operational effect similar to that in each of the embodiments shown in FIGS. 3C to 3G.

Although the embodiments of the present invention have been described in detail, it will be understood that the present invention is not limited to the above-described embodiments, and various modifications in design may be made without departing from the spirit and scope of the invention defined in claims.

For example, although the pressure valves V adapted to be opened when the internal pressure in the first air bag $B_S$ exceeds the predetermined value, have been illustrated as a gas flow limiting means in the above-described embodiments, a through-hole having a constricting function may be provided in place of the pressure valves V. In this case, when the internal pressure in the first air bag $B_S$ is low, the gas is little passed through the through-hole. When the first air bag $B_S$ is sufficiently developed to result in an increased internal pressure therein, the gas is passed through the through-hole to develop the second air bag $B_F$. Thus, it is possible to develop the first and second air bags $B_S$ and $B_F$ with a time lag therebetween by an extremely simple structure.

Additionally, in place of separate formation of the first and second air bags $B_S$ and $B_F$ followed by uniting of them by the stitching 1, the first and second air bags $B_S$ and $B_F$ may be integrally formed and partitioned from each other by a stitching.

What is claimed is:

1. A method for developing an air bag for a vehicle into a vehicle compartment to hold an occupant of the vehicle, by a high pressure gas generated by an inflator, when an acceleration greater than a predetermined value is detected, said air bag comprising a first portion to be developed between said occupant and a side door, and a second portion to be developed between said occupant and an instrument panel, wherein the method comprises the steps of first developing said first portion of the air bag and then developing said second portion of the air bag.

2. A method for developing an air bag means for a vehicle into a vehicle compartment to hold an occupant of the vehicle, by a high pressure gas generated by an inflator means, when an acceleration greater than a predetermined value is detected, wherein said air bag means comprises a first air bag which is developed into a space between the occupant and a side door, and a second air bag which is developed into a space between the occupant and an instrument panel, said first and second air bags being integrally coupled to each other, the method comprising the steps of developing said first air bag, and then developing said second air bag with a predetermined time lag after the development of said first air bag.

3. A method for developing an air bag means for a vehicle according to claim 2, wherein said first and second air bags have internal spaces independent from each other and include a first inflator and a second inflator, respectively, said second inflator being operated with said predetermined time lag after operation of said first inflator.

4. A method for developing an air bag means for a vehicle according to claim 2, wherein internal spaces in said first and second air bags are in communication with each other through a gas flow limiting means, the high pressure gas generated by said inflator means being supplied from said internal space in said first air bag through said gas flow limiting means into said internal space in said second air bag.

* * * * *